R. BROWN.
Coffee Roaster.
No. 19,827.
Patented April 6, 1858.
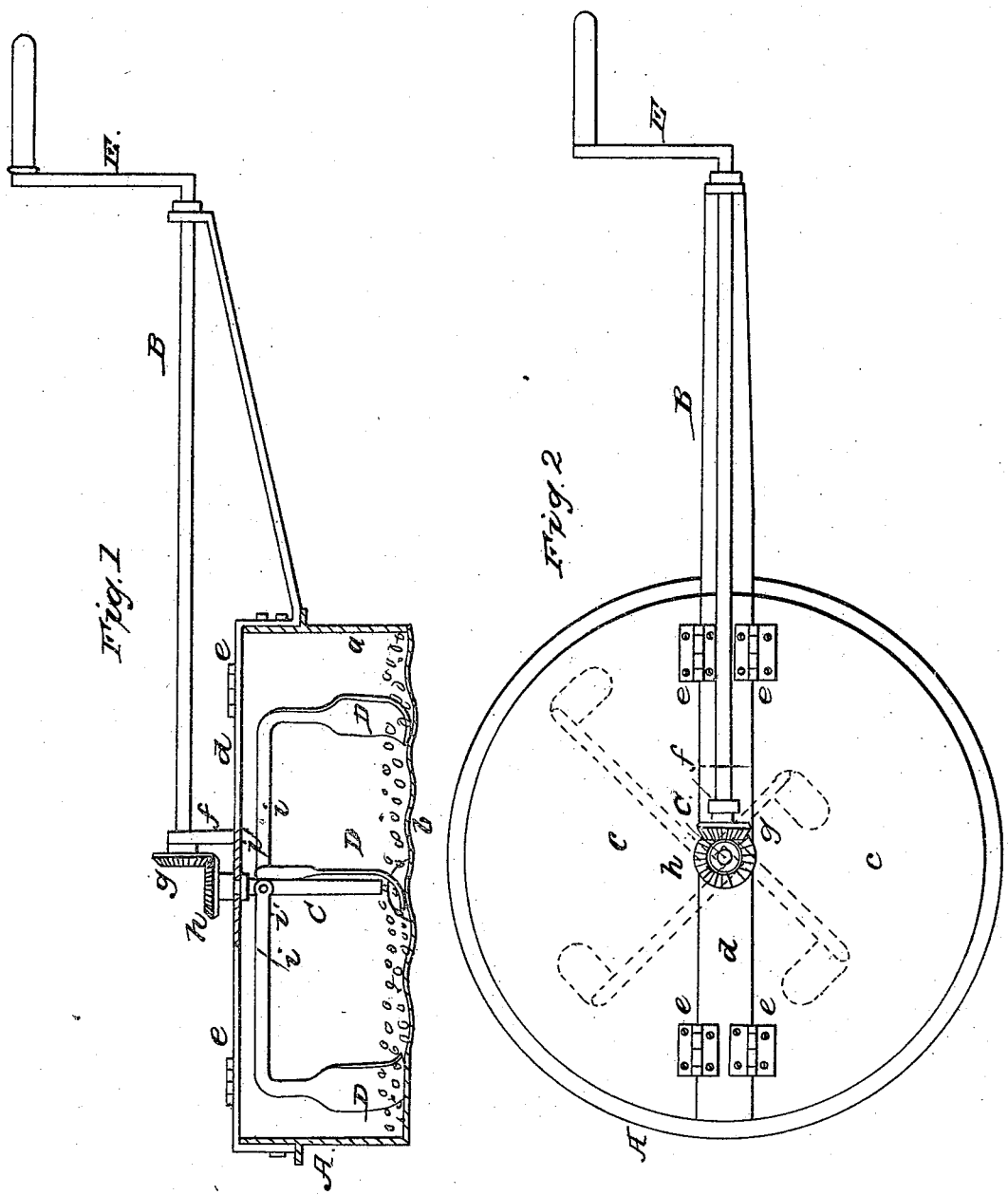

UNITED STATES PATENT OFFICE.

ROBT. BROWN, OF ASHTABULA, OHIO.

APPARATUS FOR ROASTING COFFEE.

Specification of Letters Patent No. 19,827, dated April 6, 1858.

*To all whom it may concern:*

Be it known that I, ROBERT BROWN, of Ashtabula, in the county of Ashtabula and State of Ohio, have invented a new and useful Device for Parching or Roasting Coffee; and I do hereby declare that the following is a full, clear, and exact description of the same, reference being had to the annexed drawings, making a part of this specification, in which—

Figure 1, is a vertical central section of my improvement. Fig. 2, is a plan or top view of ditto.

Similar letters of reference indicate corresponding parts in the two figures.

The object of this invention is to obtain a portable parching or roasting device for domestic use, one that can be readily operated and not at all affected by the "buckling" of its bottom on account of the action of the fire upon it.

To enable those skilled in the art to fully understand and construct my invention I will proceed to describe it.

A, represents a circular vessel which may be constructed of sheet metal, tinned plate will probably be most generally used for the side $a$, and sheet iron for the bottom $b$. This vessel may be provided with covers $c, c$ hinged to a central cross piece $d$, as shown at $e$. The cross piece $d$, extends some distance beyond the vessel A, and its outer end serves as a bearing for the outer end of a horizontal shaft B, the inner end of which has its bearing in a small upright $f$, attached to the cross piece $d$. The inner end of the shaft B, has a bevel pinion $g'$ on it, and this pinion gears into a corresponding pinion $h$, which is attached to the upper end of a vertical shaft C, said shaft passing through the center of the cross piece $d$, and having its lower end stepped at the center of the bottom $b$.

The upper part of the shaft C, just below the cross piece $d$, is of quadrilateral form, and a rod $i$, is pivoted to each side of the shaft, the rods being allowed to work freely on the pivots, which are designated by $i'$. The rods $i'$, are of different lengths and to the outer end of each rod a vertical scraper or shovel formed blade D, is attached. The outer end of the shaft B, has a crank E, attached to it. The cross piece $d$, shafts B, C, rods $i$, and scrapers or blades D, are of course constructed of metal.

The operation is as follows: The coffee is placed in the vessel A, which is placed over a proper fire and the shaft B, is turned by hand, the scrapers or shovels rotated and the coffee properly stirred and as each rod $i$, is of a different length the scrapers or shovels will traverse over the surface of the bottom $b$, at different points in order that the whole of the coffee may be properly stirred.

The bottom $b$, in consequence of being subjected to the fire soon becomes uneven. This is technically termed "buckling" and if the rods $i$, were not pivoted to the shaft C, as shown the scrapers or shovels could not be rotated when the bottom became uneven, but by pivoting the rods $i$, to the shaft, the scrapers or shovels are allowed to work freely up and down to accommodate themselves to the uneven surface. The cross piece $d$, by extending beyond the vessel A, as shown in the drawings not only serves as a support for the outer end of shaft B, but also serves as a handle for the device.

I do not claim separately any of the parts herein described; but,

I claim as new and desire to secure by Letters Patent,

The vessel A, provided with the adjustable rotating scrapers or blades D, attached to rods $i$, of varying lengths which rods are pivoted to the shaft C, and the whole arranged to operate as and for the purpose herein described.

ROBERT BROWN.

Witnesses:
EDWIN HERRIMAN,
JNO. W. HILL.